(12) United States Patent
Son et al.

(10) Patent No.: US 9,208,683 B2
(45) Date of Patent: Dec. 8, 2015

(54) METHOD AND APPARATUS FOR WARNING A DRIVER OF CARELESS DRIVING

(75) Inventors: Joon-Woo Son, Daegu (KR); Su-Wan Park, Daegu (KR); Tae-Young Lee, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 344 days.

(21) Appl. No.: 13/882,282

(22) PCT Filed: Sep. 6, 2011

(86) PCT No.: PCT/KR2011/006568
§ 371 (c)(1),
(2), (4) Date: Apr. 29, 2013

(87) PCT Pub. No.: WO2012/057449
PCT Pub. Date: May 3, 2012

(65) Prior Publication Data
US 2013/0215274 A1    Aug. 22, 2013

(30) Foreign Application Priority Data
Oct. 29, 2010  (KR) .................. 10-2010-0106482

(51) Int. Cl.
B60Q 1/00 (2006.01)
G08G 1/04 (2006.01)
G08B 21/06 (2006.01)
B60W 40/09 (2012.01)
B60W 50/14 (2012.01)
B62D 15/02 (2006.01)

(52) U.S. Cl.
CPC .............. *G08G 1/04* (2013.01); *B60W 40/09* (2013.01); *B60W 50/14* (2013.01); *B62D 15/029* (2013.01); *G08B 21/06* (2013.01); *B60W 2420/42* (2013.01); *B60Y 2400/3015* (2013.01)

(58) Field of Classification Search
CPC ...... G08B 21/06; B60W 40/09; B60W 50/14; B60W 2420/42
USPC .............. 340/436, 439, 576, 937; 180/272
See application file for complete search history.

(56) References Cited

U.S. PATENT DOCUMENTS

| | | | |
|---|---|---|---|
| 6,278,362 B1 * | 8/2001 | Yoshikawa et al. | 340/439 |
| 6,317,057 B1 | 11/2001 | Lee | |
| 7,965,871 B2 | 6/2011 | Ihara et al. | |
| 8,519,853 B2 * | 8/2013 | Eskandarian et al. | 180/272 |
| 2007/0233386 A1 | 10/2007 | Saito et al. | |
| 2008/0013790 A1 | 1/2008 | Ihara et al. | |
| 2009/0028388 A1 | 1/2009 | Amagasaki | |

FOREIGN PATENT DOCUMENTS

| | | |
|---|---|---|
| JP | 2008-021161 A | 1/2008 |
| KR | 10-0373002 A | 2/2003 |

\* cited by examiner

*Primary Examiner* — John A Tweel, Jr.
(74) *Attorney, Agent, or Firm* — Paratus Law Group, PLLC

(57) ABSTRACT

Provided is an apparatus for sensing careless driving using a camera attached to a vehicle and warning a driver of a careless driving state, the apparatus including: a driving state determination unit for sensing a driving state of a vehicle based on a video of lanes; a lane-deviation sensing unit for sensing whether the vehicle deviated from the lane based on the video of lanes received from an image-processing unit; and a careless driving warning unit for generating a warning signal based on driving state information and lane deviation information received from the driving state determination unit and the lane-deviation sensing unit, respectively.

13 Claims, 2 Drawing Sheets

METHOD AND APPARATUS FOR WARNING A DRIVER OF CARELESS DRIVING

CROSS REFERENCE TO PRIOR APPLICATION

This application is a National Stage Patent Application of PCT International Patent Application No. PCT/KR2011/006568 (filed on Sep. 6, 2011) under 35 U.S.C. §371, which claims priority to Korean Patent Application No. 10-2010-0106482 (filed on Oct. 29, 2010), which are all hereby incorporated by reference in their entirety.

TECHNICAL FIELD

The present invention relates to a method and apparatus for sensing careless driving by using a camera attached to a vehicle and warning a driver of a careless driving state.

BACKGROUND ART

According to technological advancements, the use of advanced driver assistance systems (ADASs) for assisting a driver has increased. Examples of the ADAS include a forward collision warning system (FCWS) for warning a forward collision, and a lane departure warning system (LDWS) for warning a lane deviation. However, an unnecessary warning may be raised if the ADAS is unable to recognize a state of a driver, is thereby causing the driver inconvenience. In other words, it needs to be determined whether a lane change is intended by the driver or is caused by careless driving. Meanwhile, if abnormal driving, such as a lane deviation, occurs during high-speed driving, a time for reacting to a warning is very short, and thus an apparatus for sensing carelessness of the driver early and warning the driver is required.

DISCLOSURE OF THE INVENTION

Technical Problem

The present invention provides a method and apparatus for determining whether a lane deviation is caused by careless driving by observing a driving pattern of a driver.

Technical Solution

According to an aspect of the present invention, there is provided an apparatus for warning a driver of careless driving, the apparatus including: a driving state determination unit for sensing a driving state of a vehicle based on a video of lanes; a lane-deviation sensing unit for sensing whether the vehicle deviated from the lane based on the video of lanes received from an image-processing unit; and a careless driving warning unit for generating a warning signal based on driving state information and lane deviation information received from the driving state determination unit and the lane-deviation sensing unit, respectively.

According to another aspect of the present invention, there is provided a method of warning a driver of careless driving, the method including: sensing a driving state of a vehicle based on a video of lanes; sensing whether the vehicle deviated from the lane based on the video of lanes received from an image-processing unit; and generating a warning signal based on driving state information and lane deviation information received from a driving state determination unit and a lane-deviation sensing unit, respectively.

Advantageous Effects

One or more embodiments of the present invention may have effects including following advantages. However, since one or more embodiments of the present invention do not include all of the effects, it should not be understood that the scope of right of the present invention is limited by the effects.

According to an embodiment of the present invention, a lane deviation can be accurately warned by considering a driving state of a vehicle. Also, the present invention can be realized at a low cost by using a camera or navigation system installed in the vehicle.

BEST MODE FOR CARRYING OUT THE INVENTION

One or more embodiments of the present invention may have effects including following advantages. However, since one or more embodiments of the present invention do not include all of the effects, it should not be understood that the scope of right of the present invention is limited by the effects.

Terms used herein may be understood as follows.

While such terms as "first," "second," etc., may be used to describe various components, such components must not be limited to the above terms. For example, a first component may be referred to as a second component, and similarly, a second component may be referred to as a first component.

It will also be understood that when a component is "connected" to another component, it can be directly connected to the other component, or an intervening component may also be present. However, when a component is "directly connected" to another component, an intervening component is not present. Other expressions describing a relationship between components, such as "between" and "directly between", or "adjacent to" and "directly adjacent to", may be understood in the same manner.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Operations may be performed in an order different from a stated order, unless a predetermined order is specifically described. In other words, operations may be performed in the stated order, at the same time, or in a reverse order.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
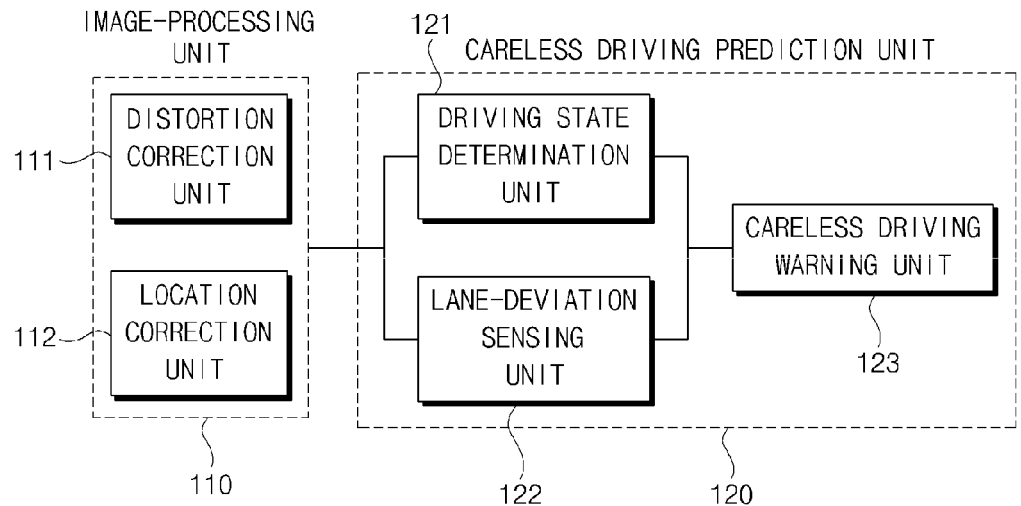
FIG. 1 is a block diagram of an apparatus for warning a driver of careless driving, according to an embodiment of the present invention.

FIG. 1 is a block diagram of an apparatus for warning a driver of careless driving, according to an embodiment of the present invention.

Referring to FIG. 1, the apparatus includes an image-processing unit 110 and a careless driving prediction unit 120. The image-processing unit 110 includes a distortion correction unit 111 and a location correction unit 112, and the careless driving prediction unit 120 includes a driving state determination unit 121, a lane-deviation sensing unit 122, and a careless driving warning unit 123.

According to an embodiment, the image-processing unit 110 receives a video of lanes from a camera (not shown) installed in a vehicle. The video of lanes is taken by the camera installed in front or at the rear of the vehicle. Considering an installation location and an installation angle of the camera, the camera may be installed at the rear of the vehicle to take a better video of lanes. A video captured by a rear camera is distorted compared to an actual video due to characteristics of a wide-angle lens for capturing a wide area. Accordingly, a distorted video of lanes may be corrected by the distortion correction unit 111. The installation location of the camera may vary based on the vehicle, and a vanishing point may vary and the video may be tilted according to the installation location. Accordingly, leaning to one lane caused by the installation location of the camera is corrected by the location correction unit 112. According to an embodiment, the distortion correction unit 111 and the location correction unit 112 may each correct the video of lanes via an image process, and according to another embodiment, the distortion correction unit 111 may also perform video correction performed by the location correction unit 112.

The careless driving prediction unit 120 senses a driving state of the vehicle based on the video of lanes received from the image-processing unit 110. The driving state determination unit 121 recognizes a left lane and a right lane of the vehicle from the video of lanes, and sets a center point for calculating a lane change on a horizontal line connecting the left lane and the right lane. Then, the driving state determination unit 121 calculates a standard deviation of the vehicle moving left or right based on the center point for a predetermined period of time, and senses the driving state to be a careless driving state when the standard deviation is higher than a threshold value.

The lane-deviation sensing unit 122 senses that the vehicle deviated from a lane when only one lane is recognized from the video of lanes.

The careless driving warning unit 123 generates a weak warning signal when the driving state determination unit 121 senses the driving state to be the careless driving state, and generates a strong warning signal when the lane-deviation sensing unit 122 senses that the vehicle deviated from a lane. Table 1 below shows whether a warning signal is generated according to an embodiment. Even when the lane-deviation sensing unit 122 sensed a lane deviation, a warning signal is not generated if the driving state determination unit 121 does not sense the driving state to be the careless driving state. Accordingly, an unnecessary warning signal is not generated during a lane change according to normal driving.

TABLE 1

| Driving state determination unit | Lane-deviation sensing unit | Careless driving warning unit |
|---|---|---|
| X | ○ | No warning signal |
| ○ | X | Weak warning signal |
| ○ | ○ | Strong warning signal |

Meanwhile, when the lane-deviation sensing unit 122 does not recognize lanes from the video of lanes for a predetermined period of time, the careless driving warning unit 123 does not generate a warning signal by recognizing a driving road of the vehicle to be an unpaved road.

Figure 2:
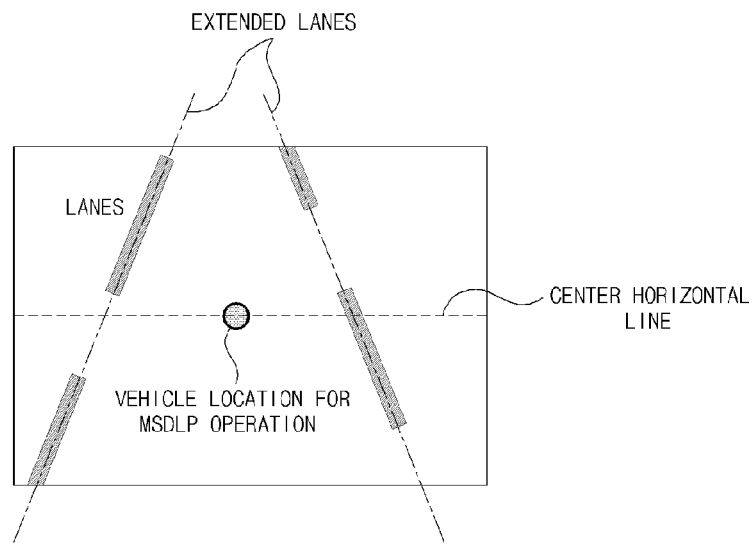
FIG. 2 is a schematic diagram for describing determining of a center point based on a video of lanes and sensing a driving state of a vehicle based on movement around the center point.

FIG. 2 is a schematic diagram for describing determining of a center point based on a video of lanes and sensing a driving state of a vehicle based on movement around the center point. According to an embodiment, a modified standard deviation lane position (MSDLP) operation unit senses a careless driving state based on a variation of lanes for a predetermined period of time by calculating an MSDLP value.

The MSDLP operation unit measures a baseline by monitoring a video of lanes for a predetermined period of time after a vehicle is driven. Here, the baseline does not mean a predetermined location value at a center point between a left lane and a right lane. The vehicle moves left and right to a certain degree even in a normal driving state. Thus, the baseline is calculated via a standard deviation based on how much the vehicle moves based on the center point for a predetermined period of time. Meanwhile, the baseline is measured several minutes after the vehicle is driven. For first several minutes after the vehicle starts to be driven, a driver may not concentrate on driving due to device manipulation, or the like. Also, a lane is frequently changed to enter a main road from parking spot. Thus, a time for measuring the baseline may be determined by considering a point of time when stable driving starts. Alternatively, a baseline may be stored in a storage unit (not shown).

After measuring the baseline, the MSDLP value is calculated. In order to calculate the MSDLP value, the MSDLP operation unit selects a reference location to be used as a lane change. Lanes recognized from the video of lanes are extended to prepare extended lanes. A center point of on a horizontal line connecting an extended left lane and an extended right lane is searched for to be used as a lane location value for an MSDLP operation. The MSDLP value is calculated via standard deviation on left and right movement of the vehicle for a predetermined period of time. The MSDLP value is calculated as follows, according to an embodiment. Videos of lanes collected for a predetermined period of time are high-pass filtered at a cut-off frequency of 0.1 Hz by using a 2-dimensional butter-worth-filter. When a standard deviation is calculated by collecting data excluding data that failed to recognize lanes and data that recognized only one lane from among filtered data, the calculated standard deviation is used as the MSDLP value. The MSDLP value is compared with the measured baseline, and when a MSDLP percentage compared to the baseline is equal to or higher than a predetermined percentage, a warning message is transmitted to a careless driving warning unit.

Figure 3:
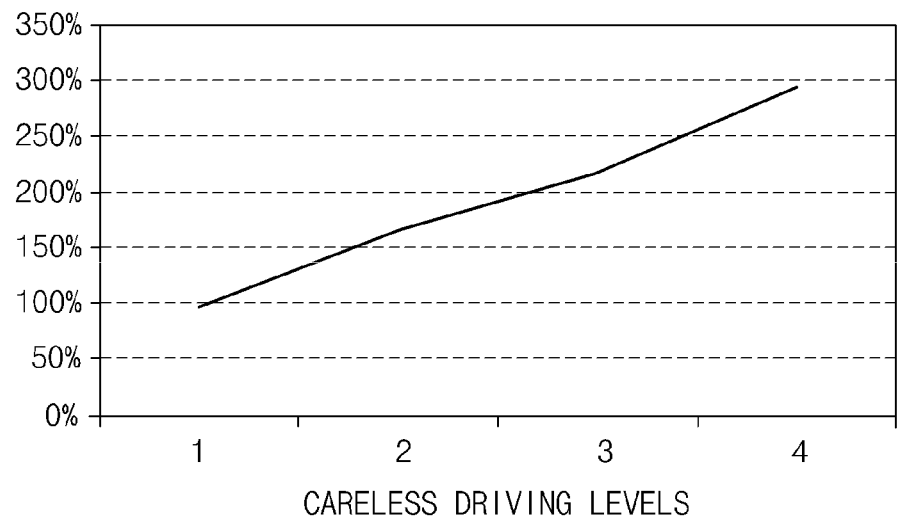
FIG. 3 is a graph of a modified standard deviation lane position (MSDLP) percentage compared to a baseline, according to careless driving degrees.

FIG. 3 is a graph of an MSDLP percentage compared to a baseline, according to careless driving degrees. In FIG. 3, a careless driving level 1 is a driving state without careless driving, and the MSDLP percentage compared to the baseline is 100%. The MSDLP percentage is measured at predetermined time intervals, and when the MSDLP percentage is higher than 250%, an MSDLP operation unit senses a driving state of a vehicle to be a careless driving state, and controls a careless driving warning unit to generate a warning signal. Here, when the MSDLP percentage is higher than 250%, the warning signal is not immediately generated, but the warning signal is generated when the MSDLP percentage is still higher than 250% after a predetermined period of time. Accordingly, the warning signal may be prevented from being generated if lanes are not temporarily maintained due to a lane change or any other reason. According to an embodiment, the warning signal is generated when the MSDLP percentage is higher than 250%, but a value of 250% may vary according to a weather condition or whether a vehicle driving time is day or night.

A lane-deviation sensing unit controls the careless driving warning unit to generate a strong warning signal by sensing that the vehicle deviated from a lane if only one lane is recognized from a video of lanes. When a driving state or lanes of the vehicle are not recognized for a predetermined period of time, the lane-deviation sensing unit stops an operation of the MSDLP operation unit by determining that the vehicle entered an unpaved road.

According to the above embodiment, an apparatus for warning a driver of careless driving may accurately warn the driver about a lane deviation.

The invention can also be embodied as computer readable codes on a computer readable recording medium. The computer readable recording medium is any data storage device that can store data which can be thereafter read by a computer system. According to an embodiment, the apparatus may be driven as an application program in a navigation system installed in the vehicle at a low cost.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An apparatus for warning a driver of careless driving, the apparatus comprising:
   a driving state determination unit for sensing a driving state of a vehicle based on a video of lanes;
   a lane-deviation sensing unit for sensing whether the vehicle deviated from the lane based on the video of lanes received from an image-processing unit; and
   a careless driving warning unit for generating a warning signal based on driving state information and lane deviation information received from the driving state determination unit and the lane-deviation sensing unit, respectively,
   wherein the driving state determination unit senses the driving state of the vehicle according to a modified standard deviation lane position (MSDLP) operation.

2. The apparatus of claim 1, wherein the driving state determination unit recognizes a left lane and a right lane of the vehicle in the video of lanes, and sets a center point of the vehicle on a horizontal line connecting the left lane and the right lane.

3. The apparatus of claim 2, wherein the driving state determination unit calculates a standard deviation of the vehicle moving left or right based on the center point during a predetermined period of time, and when the standard deviation is higher than a threshold value, senses the driving state of the vehicle to be a careless driving state.

4. The apparatus of claim 1, wherein the lane-deviation sensing unit senses that the vehicle deviated from the lane when only one lane is recognized from the video of lanes.

5. The apparatus of claim 1, wherein the careless driving warning unit generates a weak warning signal when the driving state determination unit senses the driving state of the vehicle to be a careless driving state, and generates a strong warning signal when the lane-deviation sensing unit senses that the vehicle deviated from the lane.

6. The apparatus of claim 5, wherein the careless driving warning unit does not generate a warning signal by recognizing a driving road of the vehicle to be an unpaved road when the lane-deviation sensing unit does not recognize a lane from the video of lanes.

7. An apparatus for warning a driver of careless driving, the apparatus comprising:
   a driving state determination unit for sensing a driving state of a vehicle based on a video of lanes;
   a lane-deviation sensing unit for sensing whether the vehicle deviated from the lane based on the video of lanes received from an image-processing unit;
   a careless driving warning unit for generating a warning signal based on driving state information and lane deviation information received from the driving state determination unit and the lane-deviation sensing unit, respectively; and
   a distortion correction unit for correcting a video distorted by a lens of a camera; and
   a location correction unit for correcting a location of a video according to an installation location of the camera.

8. A method of warning a driver of careless driving, the method comprising:
   sensing a driving state of a vehicle based on a video of lanes;
   sensing whether the vehicle deviated from the lane based on the video of lanes received from an image-processing unit; and
   generating a warning signal based on driving state information and lane deviation information received from a driving state determination unit and a lane-deviation sensing unit, respectively,
   wherein the sensing of the driving state comprises sensing the driving state according to a modified standard deviation lane position (MSDLP) operation.

9. The method of claim 8, wherein the sensing of the driving state comprises recognizing a left lane and a right lane of the vehicle in the video of lanes, and setting a center point of the vehicle on a horizontal line connecting the left lane and the right lane.

10. The method of claim 9, wherein the sensing of the driving state comprises calculating a standard deviation of the vehicle moving left or right based on the center point for a predetermined period of time, and when the standard deviation is higher than a threshold value, sensing the driving state of the vehicle to be a careless driving state.

11. The method of claim 8, wherein the sensing of whether the vehicle deviated from the lane comprises sensing that the vehicle deviated from the lane when only one lane is recognized in the video of lanes.

12. The method of claim 8, wherein the generating of the warning signal comprises generating a weak warning signal when the driving state of the vehicle is sensed to be a careless driving state during the sensing of the driving state, and generating a strong warning signal when the vehicle is sensed to deviate from the lane during the sensing of whether the vehicle deviated from the lane.

13. A computer readable recording medium having recorded thereon a program for executing the method of claim 8.

* * * * *